Patented Nov. 13, 1951

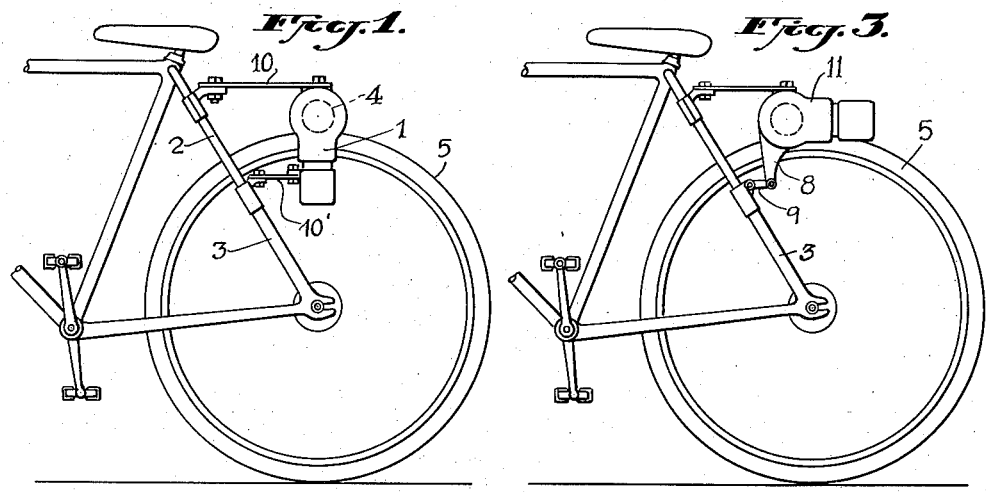
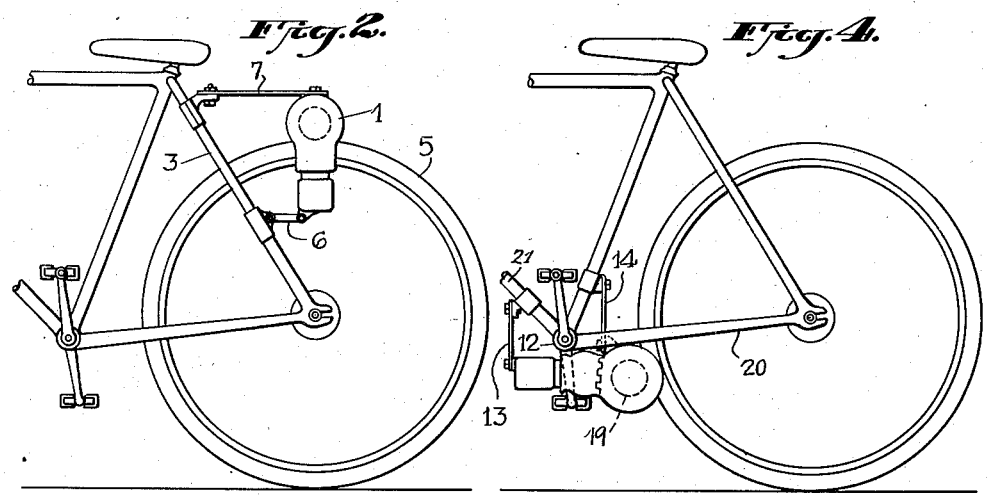
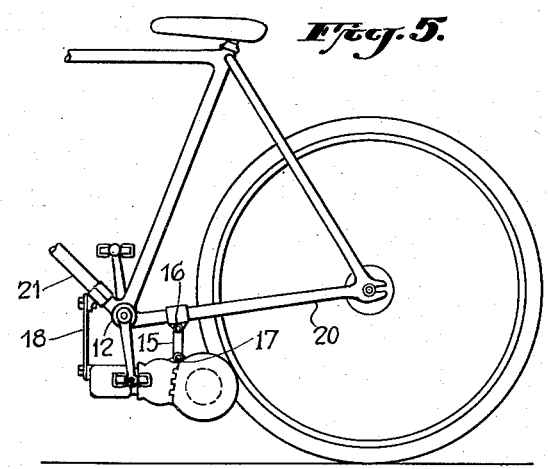

2,574,824

UNITED STATES PATENT OFFICE 2,574,824

SUPPORTING SYSTEM FOR BICYCLE ENGINES

Adalberto Garelli, Sesto San Giovanni, Italy

Application August 3, 1946, Serial No. 688,190
In Italy August 24, 1945

6 Claims. (Cl. 180—33)

The present invention refers to a new system for fixing a small internal combustion engine to a bicycle. The power transmission to the bicycle takes place by friction between a roller driven by the internal combustion engine and the tire of the rear wheel of the bicycle.

With conventional systems it is difficult to maintain adherence of the roller to the periphery of the bicycle wheel, so as to transmit the power with a constant pressure to the driving wheel, and to damp the vibrations caused by the engine and to prevent transmission of the vibrations to the frame of the vehicle.

Furthermore, as a carburetor with a constant gasoline level chamber is usually connected with the internal combustion engine, the vibrations produced by irregularities of the tire disturb the fuel level, which is an unbearable condition. The object of the present invention is to eliminate such deficiencies which are inherent in conventional systems, and to provide a construction which produces a pressure between driving roller and wheel sufficient to assure adherence, which damps transmission of the vibrations of the engine to the frame, and which prevents or at least limits generation of vibrations in a vertical direction, which are pernicious to the carburetion.

The system according to the invention is substantially characterised by a deformable quadrilateral support system for the engine on the bicycle frame, two corners of the system being fixed to the frame and the other two to the engine.

Conventional resilient means, such as springs or similar devices, one end of which is fixed to the frame, and the other end to the engine, assure constant adherence and the necessary pressure between the bicycle wheel and the driving roller, and damp the engine vibrations.

The present invention is an improvement of the system disclosed in Patent No. 2,491,076 of Mario Benazzoli, in that it provides for a parallel motion of the engine in contradistinction to the pendulum motion provided by the Benazzoli support system.

These and other characteristics of the present invention will appear more clearly from the following specification, which describes only as examples, some embodiments and illustrates the same in the annexed drawing in which:

Fig. 1 is a side view of a portion of a bicycle driven by an internal combustion engine and provided with a support system according to the invention;

Fig. 2 is a side view of a portion of a bicycle equipped with a modified support system according to the invention;

Fig. 3 is a side view of the rear portion of a bicycle with the engine in horizontal position and supported as in Fig. 2;

Fig. 4 is a side view of the rear portion of a bicycle with the engine disposed underneath the pedal crank shaft and being suspended by a flexible member connected with the forward inclined frame tube and another flexible member fixed on the saddle pillar of the bicycle frame;

Fig. 5 is a side view of the rear portion of a bicycle with the engine disposed as in Fig. 4 and suspended from the forward inclined frame tube by a plate spring and by a stiff link member pivoted at its upper end to the horizontal rear fork of the bicycle and at its lower end pivoted to the engine.

Like parts are designated by like numerals in all figures of the drawing.

Referring more particularly to Fig. 1 of the drawing, numeral 1 designates an internal combustion engine vertically disposed on one side of the rear wheel 5 of the bicycle and driving a roller 4 disposed on top of the rear wheel.

The engine is attached to the bicycle frame by means of two plate springs, the upper one of which, designated by numeral 10, is attached at one end to the inclined rear fork 2 and at the other end to the engine casing, while the lower one 10' is attached at one end to an inclined back tube 3 and at the other end to the engine's cylinder. It is clear that in this manner the engine, although it is fixed to the frame without using any pivots or hinges, can move vertically so as to cause the roller to adhere constantly to the tire or to be removed from it when necessary.

Fig. 2 illustrates a similar arrangement in which the motor is placed nearer to the frame and no room is left for a sufficient length of the lower spring. A small tie-rod 6 is provided, pivoted on a support fixed to an inclined back tube 3 and to the cylinder head of engine 1.

The rigid connection between the engine and the frame obtained through spring 7 prevents the engine vibrations from becoming excessive, even when the pivots of tie-rod 6 have developed a considerable clearance.

Fig. 3 illustrates a modification of the arrangement shown in Fig. 2, in which the engine cylinder is placed horizontally and to the rear and a tie-rod 9 is pivoted to an arm 8 extending from the casing of the engine 11. A similar arm can be placed also at the other side of the wheel, when the engine must be secured more firmly.

In the modification according to Fig. 4, the engine 19 is disposed beneath the pedal crank shaft 12 of the bicycle. The engine is attached to the frame by means of two plate springs 13 and 14, the latter extending between the two tubes of the horizontal rear fork 20. When these two tubes are very close to each other, spring 14 may be made up of two narrower plates, one on each side of the fork or may even be replaced by two steel wires. The rear suspension can also be designed as shown in Fig. 5, and one or two tie-rods 15 may be pivoted at 16 to a support attached to the horizontal rear fork 20 and at 17 to the engine casing. This arrangement facilitates the mounting of the engine on any bicycle, while retaining the great advantage of a rigid connection with the frame through front plate spring 18, which is connected with frame member 21 extending forward and upward from the pedal crank shaft 12.

The method of fixing the engine totally or partially to the frame by means of plate springs, which is a characteristic feature of the present invention, has the further advantage of low initial cost and cost of upkeep as compared with the suspension of the engine by means of an articulated quadrangle. The resilient means for producing a suitable pressure of the roller on the tire may be of any kind and for this purpose the plate springs may be replaced by bow springs.

In all embodiments of the invention illustrated, the two support elements for the engine are substantially parallel to one another and are placed along the sides of an imaginary trapezoid positioned in the plane of rotation of the rear wheel of a conventional bicycle to which the drive system according to the invention is affixed.

The modifications shown in the drawing are only given by way of example and may be varied or modified without departing from the scope of the present invention.

Having now particularly described and ascertained the nature of my said invention and in what manner the same is to be performed, I declare that what I claim is:

1. A supporting system for the engine driving the rear wheel of a motorized bicycle by means of a friction roller, said system comprising two substantially parallel support members placed along two opposed sides of an imaginary trapezoid positioned in the plane of rotation of the rear wheel, each support member having one end connected with the bicycle frame and the other end connected with the engine, at least one of said support members being of a fixed length and having its ends individually permanently rigidly connected with the bicycle frame and with the engine and being flexible in the plane of said trapezoid for permanently affording free movement of the engine in the plane of and towards and from the rear wheel.

2. A supporting system as defined in claim 1, said flexible member being a plate spring having its plane surfaces disposed at a right angle to the plane of said trapezoid.

3. A supporting system for the engine driving the rear wheel of a motorized bicycle by means of a friction roller, said system comprising two substantially parallel support members placed along two opposed sides of an imaginary trapezoid positioned in the plane of rotation of the rear wheel, each support member having one end rigidly connected with the bicycle frame and the other end rigidly connected with the engine, said support members being of a fixed length and flexible in the plane of said trapezoid for permanently affording free movement of the engine in the plane of and towards and from the rear wheel.

4. A motorized bicycle comprising a frame having a substantially horizontal fork member supporting the rear wheel of the bicycle, a tire mounted on said rear wheel, an internal combustion engine comprising a friction drive roller disposed underneath said fork member and frictionally engaging said tire, and suspension means comprising two substantially parallel support members placed along two opposed sides of an imaginary trapezoid positioned in the plane of rotation of the rear wheel, each support member having one end connected with the bicycle frame and the other end connected with the engine, at least one of said support members having its ends individually rigidly connected with the bicycle frame and with the engine and being of a fixed length and flexible in the plane of said trapezoid for affording free movement of the engine from and to the rear wheel.

5. A motorized bicycle as defined in claim 4, one of said support members extending between the prongs of said fork member.

6. A motorized bicycle comprising a frame having a pedal crank shaft, a substantially horizontal fork member supporting the rear wheel of the bicycle, an inclined frame member extending forward and upward from said shaft, an internal combustion engine disposed beneath said pedal crank shaft, a friction drive roller driven by said engine disposed underneath said fork member and engaging the rear wheel of the bicycle, and suspension means comprising a support member having one end connected with said inclined frame member and the other end connected with said engine, another support member having one end connected with said frame in the rear of said shaft and the other end connected with said engine, said support members being placed in parallel relation along two opposed sides of an imaginary trapezoid positioned in the plane of rotation of the rear wheel, at least one of said support members having its ends individually rigidly connected with the bicycle frame and with the engine and being of fixed length and flexible in the plane of said trapezoid for permanently affording free movement of the engine towards and from the rear wheel.

ADALBERTO GARELLI.

REFERENCES CITED

The following references are of record in the file of this patent:

UNITED STATES PATENTS

| Number | Name | Date |
| --- | --- | --- |
| 1,158,311 | Schunk | Oct. 26, 1915 |
| 1,364,476 | Bates | Jan. 4, 1921 |
| 1,461,869 | Franzenburg | July 17, 1923 |
| 2,274,043 | Cushman | Feb. 24, 1942 |

FOREIGN PATENTS

| Number | Country | Date |
| --- | --- | --- |
| 108,210 | Great Britain | Aug. 2, 1917 |
| 96,405 | Switzerland | Oct. 2, 1922 |
| 232,087 | Great Britain | Apr. 16, 1925 |
| 452,680 | Germany | Nov. 19, 1927 |
| 476,369 | Great Britain | Dec. 7, 1937 |